J. A. BOWERMAN.
METHOD AND APPARATUS FOR THE MANUFACTURE OF TIRES.
APPLICATION FILED APR. 9, 1919.

1,327,802. Patented Jan. 13, 1920.

INVENTOR
Joseph A. Bowerman.
BY Chapin Neal
ATTORNEYS.

UNITED STATES PATENT OFFICE.

JOSEPH A. BOWERMAN, OF CHICOPEE FALLS, MASSACHUSETTS, ASSIGNOR TO THE FISKE RUBBER COMPANY, OF CHICOPEE FALLS, MASSACHUSETTS, A CORPORATION OF MASSACHUSETTS.

METHOD AND APPARATUS FOR THE MANUFACTURE OF TIRES.

1,327,802.  Specification of Letters Patent.  Patented Jan. 13, 1920.

Application filed April 9, 1919. Serial No. 288,820.

*To all whom it may concern:*

Be it known that I, JOSEPH A. BOWERMAN, a citizen of the United States of America, residing at Chicopee Falls, in the county of Hampden and State of Massachusetts, have invented certain new and useful Improvements in Methods and Apparatus for the Manufacture of Tires, of which the following is a specification.

My invention relates to an improved method and apparatus for manufacturing pneumatic tires, particularly single tube pneumatic tires adapted for use on bicycles.

It has for its object the improvement of the means and method for forming this type of tire, and in particular the elimination of sharp bends in the fabric at the point where it passes over the valve cot and the perfection of the adhesion between the head of the valve cot and the tire forming material. The objects will more clearly appear during the description of the invention.

In the drawings, —

Figure 1:
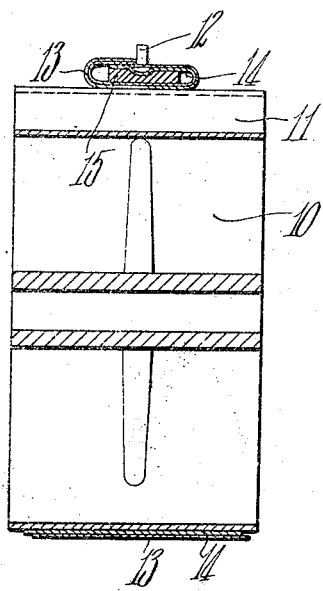
Figure 1 shows a cross-section, on line 1—1 of Fig. 2, of a drum used in the manufacture of the tires, showing a tire in the process of manufacture.
Figure 2:
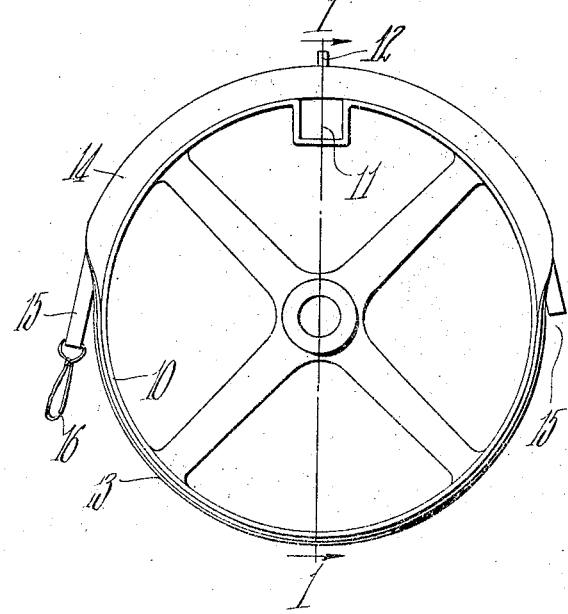
Fig. 2 is a side elevation of the same.
Figure 3:
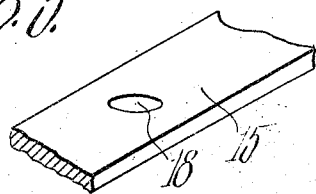
Fig. 3 is a fragmentary perspective view of a strap used in the manufacture of the tire.
Figure 4:
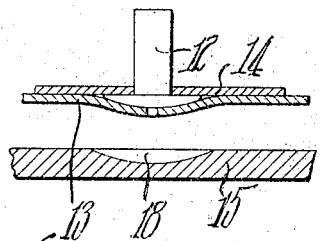
Fig. 4 is a diagrammatical sectional detail showing the tire forming material and the valve cot located adjacent the strap, illustrating the positions these elements occupy relative to each other.

The process for forming tires of this type which has been used, and on which my invention is an improvement, is fully set forth in the patent to Knadler No. 654,900, dated July 31, 1900, for method of forming pneumatic tires, and need not be described in detail here. In brief, the tire is built upon a drum 10 of a diameter substantially equal to the inner diameter of the tire to be produced, and having an axial slot 11 adapted to give clearance for the valve cot 12. (This slot is denoted by *c* in the above patent, and its function is clearly shown in Figs. 4 and 11 thereof.) Any suitable tire forming material, such as layers of rubberized fabric or alternate layers of fabric and uncured rubber, 13 and 14, are laid circumferentially of the drum and are folded into tubular form (Figs. 1 and 2) over a spacing member or strap 15, preferably flexible and relatively hard. This strap may have a handle 16 to assist in its manipulation. As the layers of fabric are folded over the strap, the latter is drawn along, serving as a spacing member to insure the tube being of the proper size, and also as a backing against which the fold may be tightly sealed with a hand-tool such as a small roller, used by the operator. The strap serves as a spacing member and a backing for the folding and pressing of the tire forming material throughout the major portion of the circumference of the tire. The last few inches of the circumference, however, must be folded without a spacing member and pressed without a backing, since the folding of this part completely closes the tube, as is fully set forth in the patent above referred to. The head of the valve cot one side of which, usually that side away from the shank, is substantially spheroidal, is placed between the layers with the shank projecting through the tire forming material.

Figure 6:
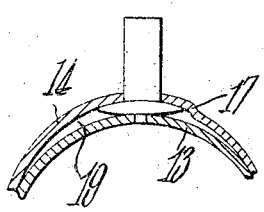
Fig. 6 is a similar view of a tire made according to the previous method of manufacture, showing the defective positioning of the fabric around the valve cot incident to the former method.

Thus far the method follows that described in the above patent. My improvement relates to the positioning of the valve cot 12. In the former process, the strap 15 was flat, and in consequence the action of the hand-tool was to cause a sharp bend of the fabric layers, as indicated at 17, due to the head of the valve cot presenting an elevation to the hand-tool. This sharp bend greatly weakened the fabric and frequently caused ruptures or blow-outs near the valve cot. The bend usually occurred in the form indicated in Fig. 6, but sometimes took the shape of an actual reverse fold in the tire forming material. Either defect caused a weakening of the fabric; a weakening of the tire structure as a whole due to the tendency of the material to straighten out; and imperfect adhesion between the layers of material and between the material and the valve cot, as is shown at 19 in Fig. 6.

According to my invention, a spheroidal depression 18 is provided in the strap 15, into which the head of the valve cot, and the fabric covering it, may sink. This permits any desired amount of pressure being exerted by the hand-tool around the valve cot without danger of any bending of the fabric layers at this point. A more perfect adhesion between the head of the valve cot and the fabric layers is also insured.

Figure 5:
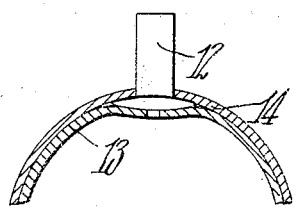
Fig. 5 is a sectional detail of a tire made according to my invention, showing the valve cot in place.

The result attained is illustrated in Fig. 5, where it will be seen that the fabric layers are arranged smoothly both above and below the valve cot. This is due to the depression 18 allowing the fabric layers, or other tire forming material, to remain, during the pressing operation, in the natural position they assume where they lie over the head of the valve cot.

While my invention has been described primarily with relation to bicycle tires, it is applicable to other cases where a headed valve cot or a patch is to be located between layers of tire forming material.

I claim—

1. A spacing member for making tires having a spheroidal depression in one surface thereof.

2. A flexible spacing member of rectangular cross-section having a spheroidal depression in one of the surfaces thereof.

3. The step in a method of making tires comprising placing tire forming material circumferentially on a drum, folding the same over a spacing member having a spheroidal depression in one surface thereof, locating a valve cot so that its head is adjacent said depression and its stem passes through the tire forming material, and pressing the tire forming material and the head of the valve cot closely together.

4. The step in a method of making single tube tires comprising folding a strip of tire forming material into tubular form, locating a valve cot with its head inclosed by the tire forming material and its shank passing through a portion of the tire forming material, and pressing the tire forming material and the head of the valve cot firmly together while preserving the natural shape of the tire forming material where it lies around the head of the valve cot.

5. The method of securing in a single tube tire a valve cot having a shank and a head, which head has one substantially spheroidal side; comprising locating the valve cot with its head between adjacent layers of tire forming material and its shank projecting through the tire forming material, and pressing the head of the valve cot and the tire forming material closely together while keeping the tire forming material tightly against the spheroidal side of the head of the valve cot.

JOSEPH A. BOWERMAN.